(12) United States Patent
Yamagishi

(10) Patent No.: US 6,389,593 B1
(45) Date of Patent: *May 14, 2002

(54) METHOD OF AND APPARATUS FOR CONTROLLING TRANSMISSION OF INFORMATION ON PROGRAMS

(75) Inventor: Yasuaki Yamagishi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,893

(22) Filed: Dec. 11, 1996

(30) Foreign Application Priority Data

Dec. 12, 1995 (JP) .............................. 7-346515

(51) Int. Cl.[7] ........................ H04N 1/173; H04N 7/08; H04N 5/445
(52) U.S. Cl. ........................ 725/9; 725/14; 725/116; 455/2.01; 348/563
(58) Field of Search ................ 348/569, 570, 348/563, 564, 906, 7, 8, 10, 12, 13, 1; 455/2, 5.1, 2.01, 39; 725/9, 10, 14, 15, 16, 17, 116, 117, 131, 134

(56) References Cited

U.S. PATENT DOCUMENTS

| 4,815,030 | A | | 3/1989 | Cross et al. ................. 364/900 |
| 5,675,738 | A | * | 10/1997 | Suzuki .................. 395/200.09 |
| 5,790,198 | A | * | 8/1998 | Roop ........................... 348/460 |
| 5,798,785 | A | * | 8/1998 | Hendricks ....................... 348/1 |
| 5,812,929 | A | * | 9/1998 | Tsutsui ......................... 348/10 |
| 5,828,945 | A | * | 10/1998 | Klosterman ................... 455/4.2 |

* cited by examiner

Primary Examiner—Matthew Luu
Assistant Examiner—Wesner Sajous
(74) Attorney, Agent, or Firm—Frommer Lawrence & Haug LLP; William S. Frommer; Joe H. Shallenburger

(57) ABSTRACT

A program-related-information transmission control method adopted on a data distributing side for transmitting program related information for programs to be broadcasted to a data receiving side by way of a data-transmission means, includes the steps of: gathering information on television-watching records obtained in accordance with relevant television-watching operations from said data receiving side; and controlling conditions for transmitting said program related information of said programs on the basis of said information on television-watching records.

6 Claims, 6 Drawing Sheets

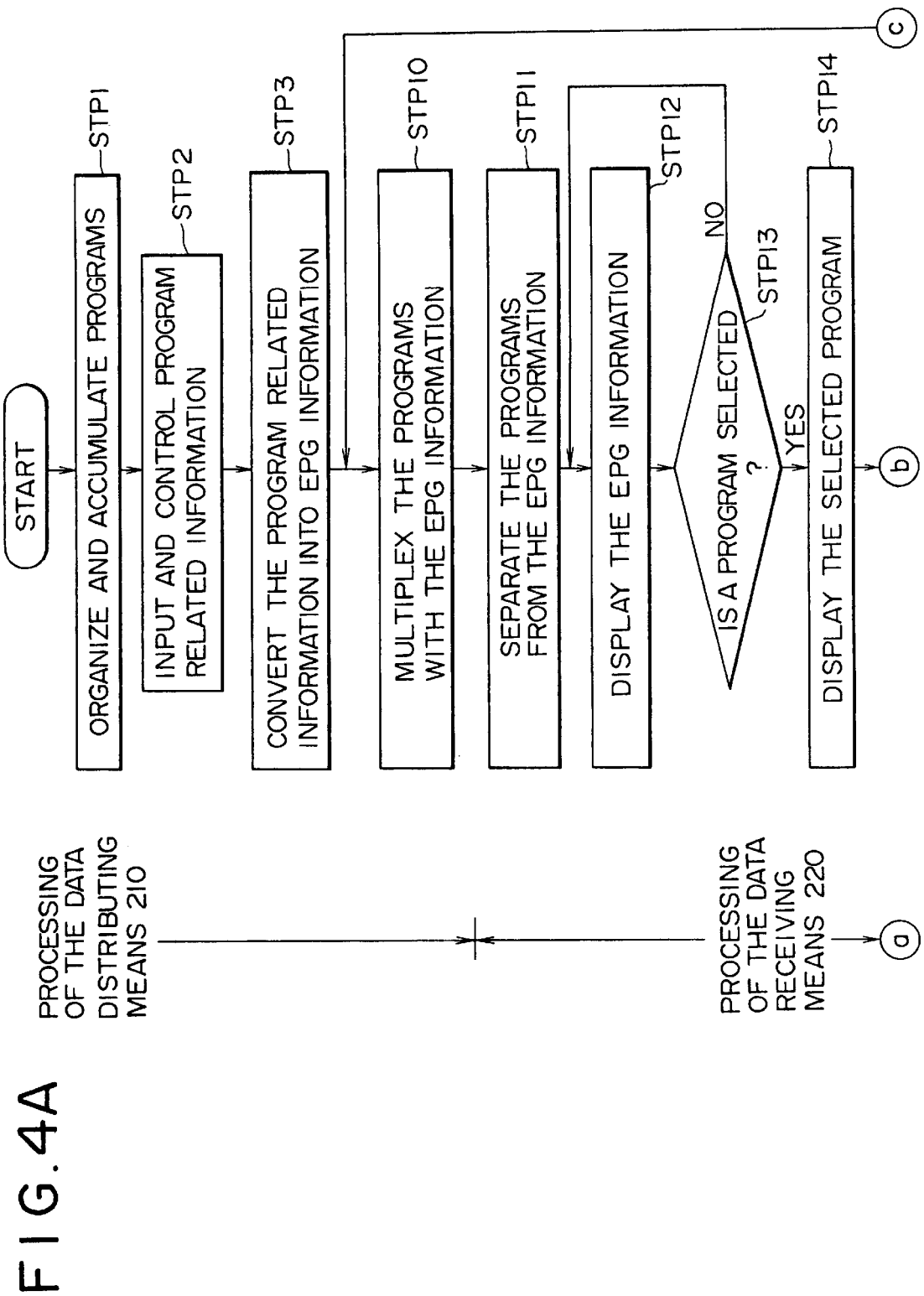

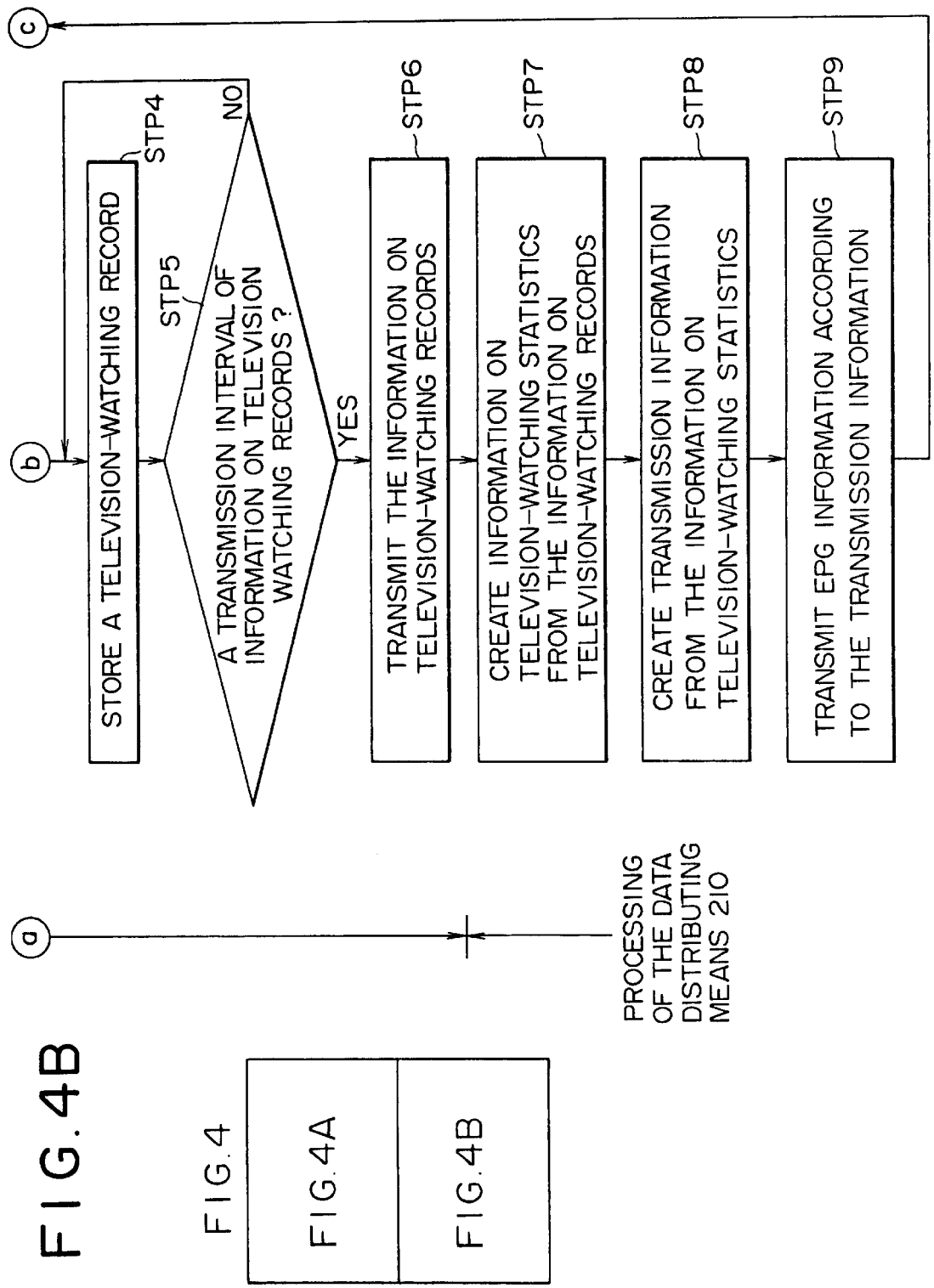

F I G. 5

| PROGRAM | ATTRIBUTE CLASS a (CATEGORY) | ATTRIBUTE CLASS b (PERFORMER) | ATTRIBUTE CLASS c (IMPORTANCE SEEN BY THE DATA DISTRIBUTOR) | ... |
|---|---|---|---|---|
| A | Aa | Ab | Ca | ... |
| B | Ba | Bb | Cb | |
| C | Ca | Cb | Cc | |
| ... | | | | |

F I G. 6

| PROGRAM | ATTRIBUTE CLASS a | ATTRIBUTE CLASS b | ATTRIBUTE CLASS c |
|---|---|---|---|
| A | 10% | 30% | 10% |
| B | 30% | 10% | 30% |
| C | 60% | 60% | 60% |

F I G. 7

| | ATTRIBUTE CLASS a | ATTRIBUTE CLASS b | ATTRIBUTE CLASS c |
|---|---|---|---|
| WEIGHTED PARAMETER | 55% | 35% | 10% |

METHOD OF AND APPARATUS FOR CONTROLLING TRANSMISSION OF INFORMATION ON PROGRAMS

BACKGROUND OF THE INVENTION

The present invention relates to a method of controlling transmission of information on programs and its apparatus which method and apparatus are used for controlling transmission of program related information required by an EPG (Electronic Program Guide) system to be displayed on a television set by way of a set-top box installed on the television-watcher side where an on-air schedule including titles, channels and times of programs scheduled to be broadcasted is viewed.

In recent years, commercial services of digital television broadcasting have been started. In the digital television broadcasting, television signals of a plurality of channels are converted into digital signals to be transmitted by way of a satellite such as a broadcasting satellite or a communication satellite or a CATV (cable television) network. In this case, television signals of the channels are each compressed by using a predetermined data compressing system and then multiplexed with each other. The multiplexed data stream is transmitted by way of a transponder of the satellite or the like. On the other hand, a parabola antenna installed at the home of the television watcher receives the transmitted data stream which is then demodulated and decoded by a set-top box called an IRD (Integrated Receiver/Decoder) before being displayed on a television monitor.

As the data compressing system, in general, the MP@ML (Main Profile @ Main Level) of MPEG (Moving Picture Experts Group) 2 in accordance with an international standard ISO/ITC (International Organization for Standardization/International Electrotechnical Commission) 13818 is adopted.

In such a digital television broadcasting system, television signals of a plurality of channels are converted into digital signals, compressed and multiplexed with each other before being transformed into a data stream of one transmission channel. Then, data streams of a plurality of transmission channels are transmitted in parallel by way of a plurality of transponders each installed in a satellite for one of the transmission channels. As a result, it is possible to transmit programs of a total of typically 100 transmission channels or more at the same time.

Here, the term program used in this specification means not only a program of the television broadcasting, but also means general data contained in a unit including computer program data distributed through data broadcasting.

Now, in a digital television broadcasting system involving a number of channels as described above, the total number of broadcastable programs increases considerably, making the so-called EPG system indispensable to the television watcher. The EPG system is a program navigation system which allows the television watcher to find and select a desired program. The EPG system transmits on-air schedule information such as titles of programs scheduled to be broadcasted, their channels and times along with the programs and displays the on-air schedule information on the screen of a television monitor by way of a set-top box installed on the television-watcher side as a program table. The on-air schedule information is referred to hereafter as EPG information. The television watcher operates a pointing device or the like provided on a remote controller in order to select a desired program while looking at the grid-displayed program table in the same way as the television watcher reads a program table on a printed matter such as a newspaper or a television-guide magazine. Then, the television watcher finds the desired program and, by carrying out an operation to select the desired program on the remote controller, an operation to switch to a channel through which the selected program is being broadcasted is carried out on the IRD side, causing the selected program to be displayed on the screen of the television monitor. In this case, if a program scheduled to be broadcasted in the future is selected, for example, processing to reserve the selected program is carried out instead.

In such a related art EPG system, EPG information is transmitted through an all-time fixed bandwidth and on the basis of static scheduling. EPG information of all channels for the few coming weeks is transmitted repeatedly at fixed transmission intervals. The bandwidth does not merely mean the amount of transmission in a unit time carried out by one transponder of a satellite. Instead, it implies the amount of repeated transmission which indicates how the number of times EPG information can be transmitted repeatedly in a unit time.

Here, let us consider a case in which a data stream is transmitted by way of a transponder of a satellite for example. Since the amount of transmission per unit time carried out by one transponder is fixed, an attempt made to transmit a large amount of EPG information of all channels for several weeks will take a long time if all the data is to be transmitted. In other words, the transmission interval at which the same information on a certain specific program is retransmitted becomes long. The long transmission interval means that, if the IRD installed on the receiver side fails to take in EPG information of the specific program for some reasons caused by a transmission error or the like, it takes a long time to display a normal program table by again taking in this EPG information. That is to say, the response of the IRD is slow, that is, a period between the time the power supply of the IRD is turned on and the time all data of the most recent EPG information is taken in to display a newest program schedule is long.

On the other hand, the television watcher demands a program table covering a long period that can be looked at one time. That is to say, it is desirable to have a program table that covers as long a period as possible including future programs. However, there is a trade-off relation between the desire to increase the amount of data of the EPG information to be transmitted as a program table and the desire to improve the response of the IRD. For this reason, by taking the gain resulting from the increased amount of EPG information and the loss due to a slower response of the IRD into consideration, in the past, EPG information of an appropriate period used to be transmitted at transmission intervals which are each determined by the period.

By the way, in the related art EPG system described above, EPG information is transmitted through an all-time fixed bandwidth and on the basis of static scheduling. Thus, EPG information of all programs for the period is transmitted equally for all the programs at the same transmission intervals without regard to the frequency at which the EPG information is accessed by the television watcher. That is to say, EPG information of programs that will be most likely accessed by a number of television watchers, that is, programs that are expected to have a high degree of popularity, is not necessarily transmitted with a high priority or transmitted at a high frequency. As a result, a program table is displayed on a television monitor at the same response as that of the IRD no matter which program of the EPG information the television watcher is interested in.

In order to improve the response of the IRD under such a constraint, it is necessary to control the transmission sequence of EPG information adaptively to accesses made by the television watcher. That is to say, the transmission interval of EPG information of specific programs needs to be shortened substantially in order to increase the transmission frequency. Such specific programs include a program having a high degree of popularity, a favorite program with the television watcher, a program having something to do with the fashion or a promotion program which the broadcasting service company deliberately wants the television watcher to watch.

In particular, in the case of an IRD which can not afford to reserve a sufficient amount of memory for storing EPG information because of manufacturing-cost constraints as is the case with a home set-top box, optimization of the transmission interval of EPG information is an important problem affecting the interactive characteristic of the user interface in the operation to select a program. With the related art EPG system described above, the problem can not be solved.

SUMMARY OF THE INVENTION

It is an object of the present invention to provide a program-related-information transmission control method of controlling transmission of information on programs and an apparatus adopting the method which are capable of implementing transmission control with a predicted access trend of the television watcher taken into consideration through control of conditions for transmitting the information on programs based on past records of popularity of programs with television watchers.

To achieve the above object, according to one aspect of the present invention, there is provided a program-related-information transmission control method adopted on a data distributing side for transmitting program related information for programs to be broadcasted to a data receiving side by way of a data-transmission means, the method including the steps of: gathering information on television-watching records obtained in accordance with relevant television-watching operations from the data receiving side; and controlling conditions for transmitting the program related information of the programs on the basis of the information on television-watching records.

According to a second aspect of the present invention, there is provided a program-related-information transmission control apparatus employed on a data distributing side for transmitting program related information for programs to be broadcasted to a data receiving side by way of a data-transmission means, the apparatus including: a television-watching-record-information collecting means for gathering information on television-watching records obtained in accordance with relevant television-watching operations from the data receiving side; and a transmission-condition controlling means for controlling conditions for transmitting the program related information of programs on the basis of the information on television-watching records.

According to the configuration described above, transmission of information on programs is controlled according to dynamic scheduling with a bandwidth varying dependently upon popularity records. Thus, information on a program that will most likely be accessed by a number of television watchers is transmitted at a high frequency. As a result, the over-all access response seen by the television watcher can be improved even if the information on such a program is transmitted by way of a transmission channel having a fixed transmission capacity.

BRIEF DESCRIPTION OF THE DRAWINGS

These and other objects as well as a number of attendant advantages of the present invention will be readily appreciated as the same becomes better understood by reference to the following detailed description of preferred embodiments when considered in connection with the accompanying drawings, wherein:

FIG. 4 is a flowchart used for explaining typical operations of the system as a whole including the apparatus for controlling transmission of information on programs shown in FIG. 2;

FIG. 5 is a table showing typical parameters for determining transmission intervals used in the apparatus for controlling transmission of information on programs shown in FIG. 2;

FIG. 6 is another table showing typical parameters for determining transmission intervals used in the apparatus for controlling transmission of information on programs shown in FIG. 2; and FIG. 7 is a still further table showing typical parameters for determining transmission intervals used in the apparatus for controlling transmission of information on programs shown in FIG. 2.

DETAILED DESCRIPTION OF THE PREFERRED EMBODIMENTS

Figure 1:
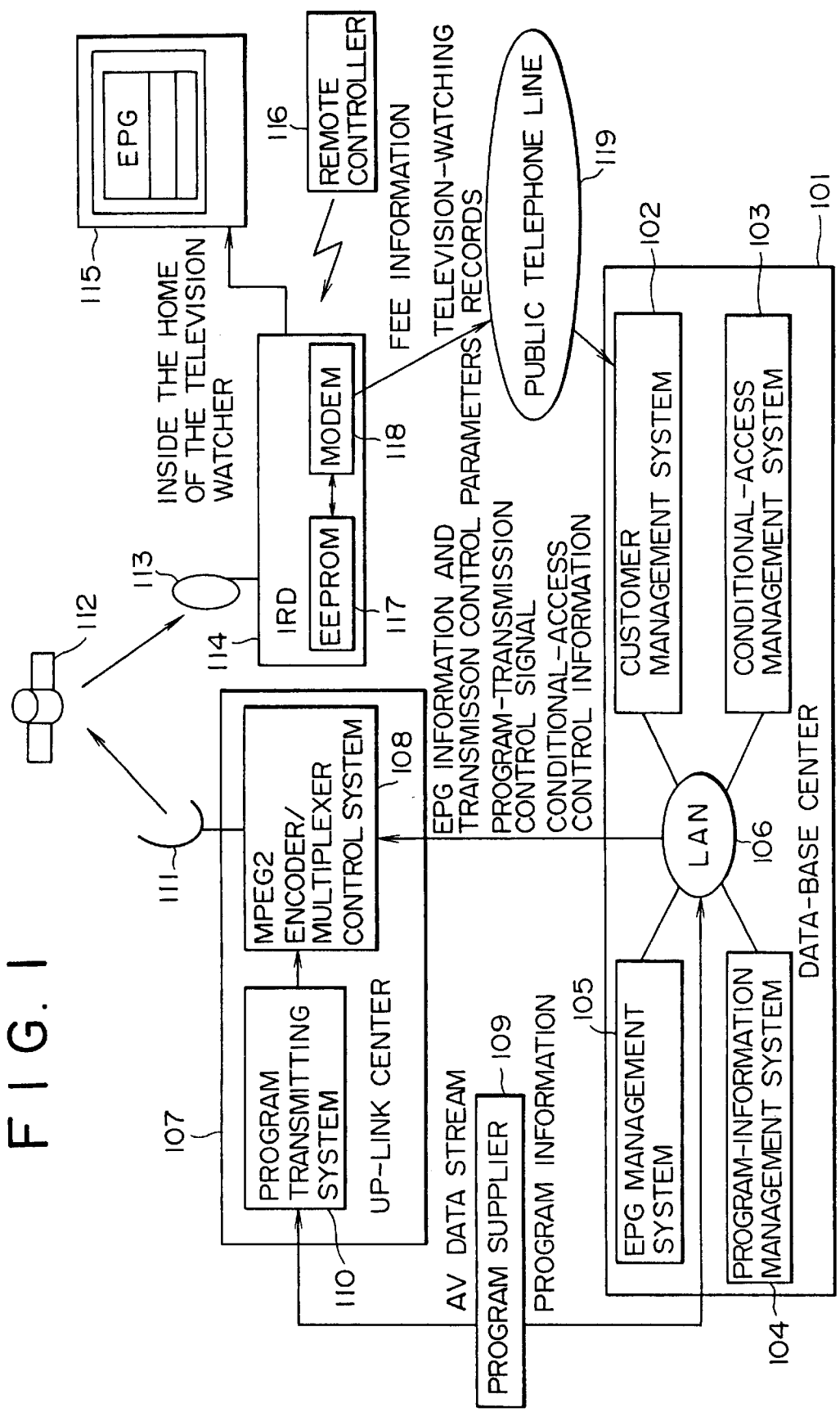
FIG. 1 is a block diagram showing an embodiment implementing a digital satellite broadcasting system adopting the method of controlling transmission of information on programs provided by the present invention.

The present invention will become more apparent from the following detailed description of some preferred embodiments with reference to accompanying diagrams showing the embodiments.

It should be noted that the embodiments described below are preferred embodiments of the present invention which have a variety of desirable technological limitations. It is further understood by those skilled in the art, however, that the scope of the present invention is not limited to the preferred embodiments as long as there is particularly no description limiting the present invention. A variety of changes and modifications can thus be made to the present invention without departing from the true spirit and the scope thereof.

Reference numerals used in the drawings and the embodiments each have three or more digits. The two least significant digits identify a configuration element among all elements shown in a figure and the rest indicates the number of the figure. For example, a configuration element denoted by reference numeral 230 is identified by the number 30 among elements shown in FIG. 2.

FIG. 1 is a block diagram showing an embodiment implementing a digital satellite broadcasting system adopting the method of controlling transmission of information on programs provided by the present invention.

As shown in the figure, a data-base center 101 for integrating the whole system includes a customer management system 102 for controlling information on television subscription contracts with end users and the like, a conditional-access management system 103 for generating information on permission of watching television programs from the television subscription contracts with end users, a program-related-information management system 104 for controlling all information on programs including a transmission control program, an EPG management system 105 for generating EPG information (or program related information) from the information on programs and a LAN (local area network) 106 for connecting the customer management system 102, the conditional-access management system 103, the program-related-information management system 104 and the EPG management system 105. Data can be exchanged among the customer management system 102, the conditional-access management system 103, the program-related-information management system 104 and the EPG management system 105 by way of the local area network 106. The EPG management system 105 generates EPG information having a data structure conforming to a DVB-SI (Digital Video Broadcasting-Service Information) format from information on a plan of broadcasting schedules of programs including channels, broadcasting times and program titles, performers, outlines and others which is obtained by referring to the program-related-information management system 104. It should be noted that the DVB-SI format is a format according to the European standard for standardizing digital broadcasting which is adopted by European broadcasting organizations and manufacturers. Then, the EPG management system 105 transmits the generated EPG information along with transmission control parameters such as transmission intervals of programs to an MPEG2 encoder/multiplexer control system 108 employed in an up-link center 107.

Determined by taking a predicted access frequency based on records of popularity of programs with television watchers into consideration, the transmission interval is an optimum value assigned to each program. The transmission interval is, in turn, used for determining an interval for inserting EPG information of programs into an MPEG2 transport stream.

An AV data stream conveying video information programs supplied by a program supplier 109 is fed to the MPEG2 encoder/multiplexer control system 108 by way of a program transmitting system 110. In the MPEG2 encoder/multiplexer control system 108, the AV data stream undergoes data compression and multiplexing based on the MPEG2 system before being further multiplexed with EPG information at transmission intervals for each program specified by the transmission control parameters supplied by the EPG management system 105. A data stream generated by the MPEG2 encoder/multiplexer control system 108 is then transmitted by way of a parabola antenna 111 employed in the up-link center 107 and a transponder installed in a satellite 112.

On the other hand, a parabola antenna 111 installed at the home of each television watcher receives the transmitted data stream which is then demodulated and decoded by a set-top box called an IRD (Integrated Receiver/Decoder) 114 before video pictures thereof can be displayed on a television monitor 115.

Here, as a remote controller 116 is operated by the television watcher to request that a program table be displayed on the television monitor 115, the IRD 114 generates text screen information such as titles, channels and times of programs scheduled to be broadcasted from EPG information extracted out off data received as a data stream and temporarily stored in memory, and then displays the text screen information on the screen of the television monitor 115 as a program schedule.

Then, the television watcher operates a pointing device or the like provided on the remote controller 116 in order to select a desired program while looking at the grid-displayed program table in the same way as the television watcher reads a program table on a printed matter such as a newspaper or a television-guide magazine, moving a cursor to the vicinity of the title of a desired program. In this way, the television watcher identifies the desired program pointed to by the cursor and, by carrying out an operation to select the desired program on the remote controller 116, an operation to switch to a channel through which the selected program is being broadcasted is carried out on the IRD 114, causing the selected program to be displayed on the screen of the television monitor 115.

At that time, a record of the operation carried out by the television watcher to select the desired program by manipulating the remote controller 116 is stored as a program-watching record (also referred to hereafter as a television-watching record) along with information on a fee for the fee-charging program for a predetermined period in an EEPROM (electrically erasable programmable read only memory) unit 117 embedded in the IRD 114. In this EEPROM unit 117, program-watching records and information on fees for the television watcher for a period of typically four weeks are retained even if the power supply of the IRD 114 is turned off. Also embedded in the IRD 114 is a modem 118. Typically once two weeks, the IRD 114 transfers the program-watching records and information on fees for the television watcher for the past two weeks along with a customer ID number cataloger in advance to the customer management system 102 by way of the modem 118 and a public telephone line 119 during a time band at the dead of night at which the public telephone line 119 has a relatively light traffic load. After correct completion of the transmission is verified, data which has been transferred is erased from the EEPROM unit 117.

As described above, television-watching records resulting from operations carried out by the television watcher to watch programs are transferred from the IRD 114 to the customer management system 102 of the data-base center 101 where television-watching records are gathered and built.

Figure 2:
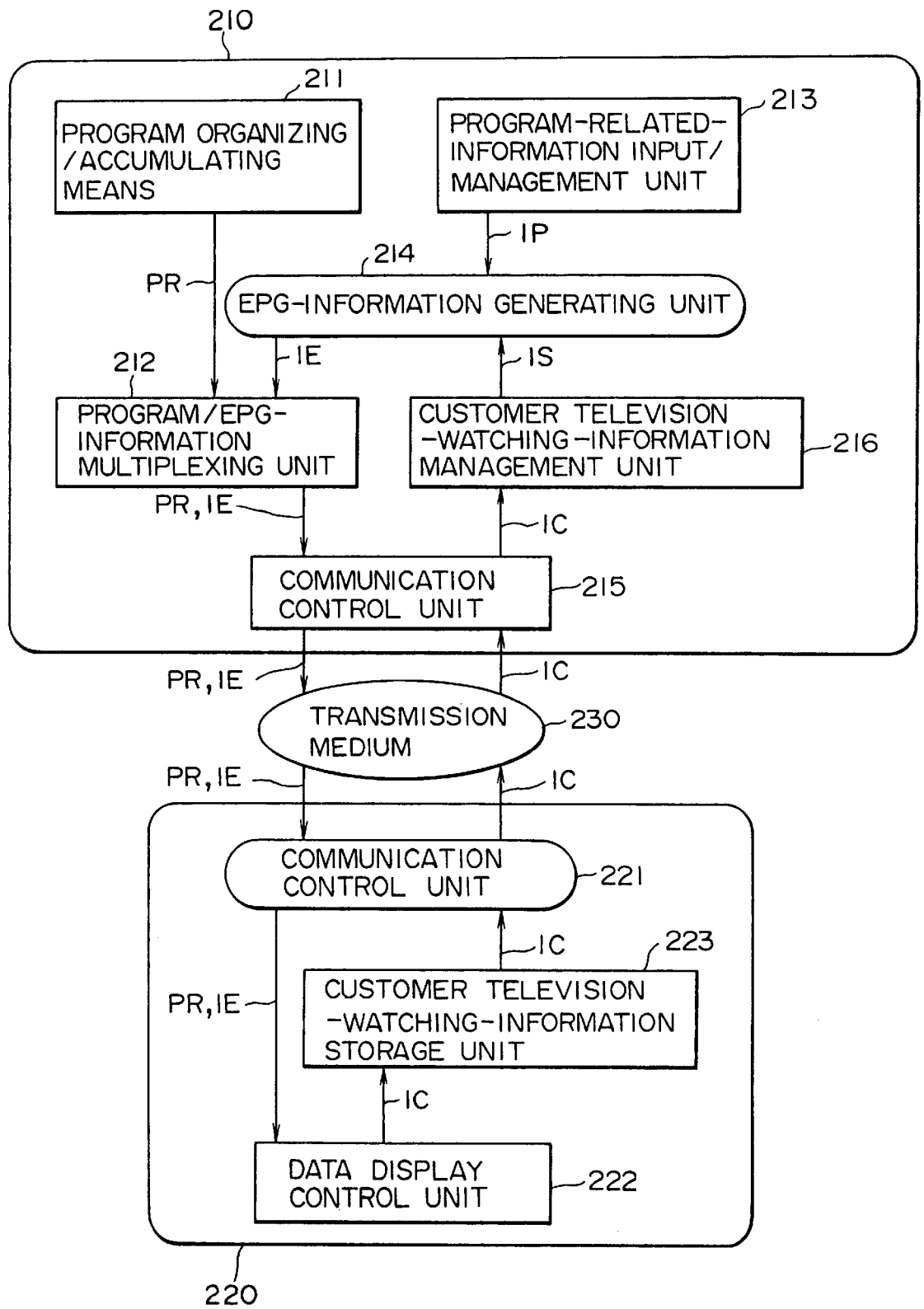
FIG. 2 is a block diagram showing an embodiment implementing an apparatus for controlling transmission of information on programs provided by the present invention.

FIG. 2 is a block diagram showing an embodiment implementing an apparatus for controlling transmission of information on programs provided by the present invention.

First of all, a relation between configuration elements of the conceptional block diagram shown in FIG. 2 and configuration elements of the more actual block diagram shown in FIG. 1 is given as follows.

A data distributing means 210 corresponds to the data-base center 101, the up-link center 107 and the program supplier 109.

A program organizing/accumulating unit 211 corresponds to the program transmitting system 110 and the program supplier 109.

A program/EPG-information multiplexing unit 212 corresponds to the MPEG2 encoder/multiplexer control system 108.

A program-related-information input/management unit 213 corresponds to the program-related-information management system 104.

A EPG-information generating unit 214 corresponds to the EPG management system 105.

A customer television-watching-information management unit 216 corresponds to the customer management system 102.

A communication control unit 215 corresponds to a portion of the MPEG2 encoder/multiplexer control system 108 in the descending direction and a portion of the customer management system 102 in the ascending direction.

A transmission medium 230 corresponds to the satellite 112 in the descending direction and the public telephone line 119 in the ascending direction.

A data receiving means 220 corresponds to the IRD 114 and the television monitor 115.

A communication control unit 221 corresponds to the front-end/decoder unit of the IRD 114 in the descending direction and the embedded modem 118 in the ascending direction.

A customer television-watching-information storage unit 223 corresponds to the EEPROM unit 117 embedded in the IRD 114.

A data display control unit 222 corresponds to the television monitor 115 and the remote controller 116.

As shown in FIG. 2, the data distributing means 210 on the data distributing side is connected to the data receiving means 220 on the data receiving side by a transmission medium 230 which serves as data-transmission means.

In the data distributing means 210, a program PR organized and accumulated by the program organizing/accumulating means 211 is transferred to the program/EPG-information multiplexing unit 212. On the other hand, a piece of program related information IP input, stored and controlled by the program-related-information input/management unit 213 is transferred to the EPG-information generating unit 214. The program related information IP will be used as an element of a piece of EPG information IE of the program PR cited above.

A piece of EPG information IE generated by the EPG-information generating unit 214 in accordance with the program related information IP is transferred to the program/EPG-information multiplexing unit 212. Then, the program PR multiplexed with the EPG information IE by the program/EPG-information multiplexing unit 212 is output to the communication control unit 215 and finally transmitted to the data receiving means 220 by way of the transmission medium 230.

On the other hand, a piece of television-watching record information IC received by the communication control unit 215 by way of the transmission medium 230 from the data receiving means 220 is passed on to the customer television-watching-information management unit 216. Then, a piece of television-watching statistics information IS created in accordance with the television-watching record information IC received by the customer television-watching-information management unit 216 is output to the EPG-information generating unit 214.

In the data receiving means 220, the communication control unit 221 receives the program PR and the EPG information IE transmitted by the data distributing means 210 by way of the transmission medium 230 and then passes on the program PR and the EPG information IE to the data display control unit 222. The information on television-watching records IC for the program PR and the EPG information IE displayed in the data display control unit 222 is output to the customer television-watching-information storage unit 223. Then, the information on television-watching records IC once stored in the customer television-watching-information storage unit 223 is output to the communication control unit 221 and finally transmitted to the data distributing means 210 by way of the transmission medium 230.

As the transmission medium 230, a data-transmission means such as a communication satellite, a telephone line or an optical-fiber cable is used.

Figure 3:
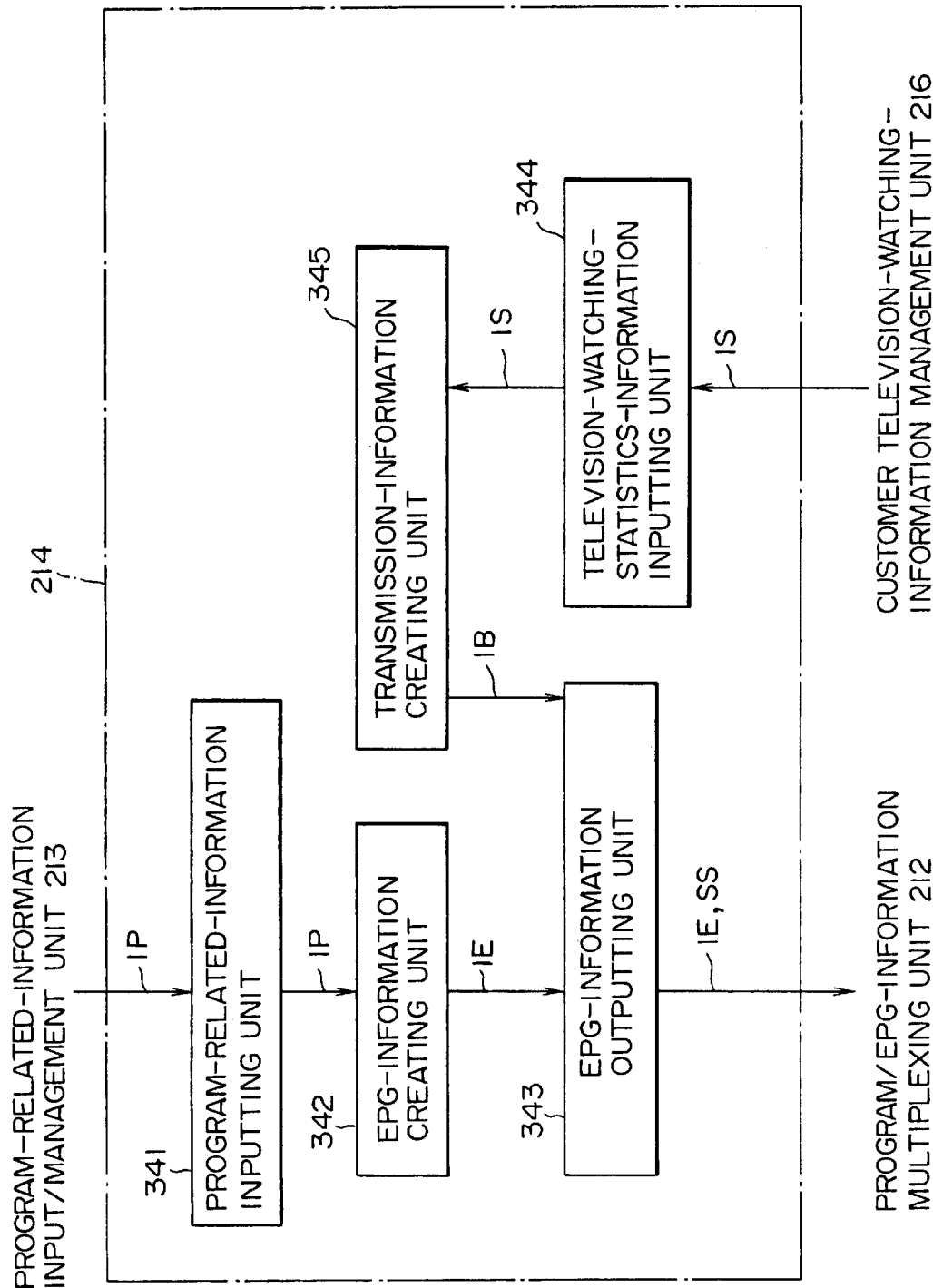
FIG. 3 is a block diagram showing a typical detailed configuration of principal components composing the apparatus for controlling transmission of information on programs shown in FIG. 2.

FIG. 3 is a block diagram showing a detailed embodiment implementing the EPG-information generating unit 214.

The EPG-information unit 214 is implemented as a computer program. As shown in the figure, program related information IP received by a program-related-information inputting unit 341 from the program-related-information input/management unit 213 is output to an EPG-information creating unit 342. Then, EPG information IE created by the EPG-information creating unit 342 in accordance with the program related information IP is output to an EPG-information outputting unit 343.

On the other hand, information on television-watching statistics IS received by a television-watching-statistics-information inputting unit 344 from the customer television-watching-information management unit 216 is output to a transmission-information creating unit 345. Transmission information IB created by the transmission-information creating unit 345 in accordance with the information on television-watching statistics IS is output to the EPG-information outputting unit 343. Then, the EPG information IE is output to the program/EPG-information multiplexing unit 212 in accordance with the transmission information IB received by the EPG-information outputting unit 343.

Typical operations of the whole system including the data distributing means 210 and the data receiving means 220 in such a configuration are explained by referring to a flow-chart shown in FIG. 4.

First of all, at a step STP1, the program organizing/accumulating unit 211 organizes and accumulates programs PR with a program ID assigned to the organized program PR. The organized program PR is then output the program/EPG-information multiplexing unit 212.

The processing flow then goes on to a step STP2 at which the program-related-information input/management unit 213 inputs program related information IP including the program ID, a transmission time, an outline and performers and other data of the program PR organized by the program organizing/accumulating unit 211 and stores and controls the program related information IP as a data base. The stored and controlled program related information IP is then output to the EPG-information creating unit 342 by way of the program-related-information inputting unit 341 of the EPG-information generating unit 214.

The processing flow then goes on to a step STP3 at which the EPG-information creating unit 342 converts the program related information IP received from the program-related-information input/management unit 213 into a format of the EPG information IE, a format which conforms to typically the DVB-SI (Digital Video Broadcasting-Service Information). The EPG information IE resulting from the conversion is then output to the EPG-information outputting unit 343.

At a step STP4, on the other hand, information on television-watching records IC of the data receiver for a program PR put on the air by the data display control unit 222 of the data receiving means 220, that is, a list of program IDs of watched programs, is stored in the customer television-watching-information storage unit 223.

The processing flow then goes on to steps STP5 and STP6 at which the information on television-watching records IC stored in the customer television-watching-information storage unit 223 is transmitted to the customer television-watching-information management unit 216 by way of the communication control unit 221, the transmission medium 230 and the communication control unit 215.

The processing flow then proceeds to a step STP7 at which the customer television-watching-information management unit 216 creates information on television-watching statistics IS by taking the statistics of the information on television-watching records IC received from the customer television-watching-information storage unit 223. The information on television-watching statistics IS is then output to the transmission-information creating unit 345 by way of the television-watching-statistics-information inputting unit 344 of the EPG-information generating unit 214.

The processing flow then goes on to a step STP8 at which the transmission-information creating unit 345 creates transmission information IB, that is, a transmission frequency of the EPG information IE, from the information on television-watching statistics IS received from the customer television-watching-information management unit 216. The created transmission information IB is then supplied to the EPG-information/transmission-information outputting unit 343.

The processing flow then goes on to a step STP9 at which the EPG-information outputting unit 343 outputs the EPG information IE received from the EPG-information creating unit 342 to the program/EPG-information multiplexing unit 212 on the basis of an on-air schedule of the program PR by taking the transmission information IB received from the transmission-information creating unit 345 into consideration.

Here, the creation of the transmission IB based on the information on television-watching records IS carried out by the transmission-information creating unit 345 is explained.

The information on television-watching records IS includes, among other data, program attributes and an evaluation of popularity and the like in predetermined program on-air time periods for the attributes of all programs. The transmission-information creating unit 345 sets in advance evaluations of the importance and the like of the attributes of all programs and weighted parameters for the attributes.

For example, as shown in FIG. 5, program categories Aa, Ba and Ca are values of attribute class a of programs A, B and C respectively. By the same token, performers Ab, Bb and Cb are values of attribute class b of the programs A, B and C respectively. Similarly, the degrees of importance seen by the data distributor Ac, Bc and Cc are values of attribute class c of the programs A, B and C respectively. It should be noted that, in order to simplify the explanation, only three programs and three types of attribute class are given. However, the scope of the present invention is not limited by three programs and three types of attribute class.

First of all, the transmission priorities for pieces of EPG information of the programs A, B and C for the attribute class a are found. On a certain day, for example, in a period of time between 0:00 to 12:00, the sums of popularity rates pertaining to the attribute class a of the on-air programs A, B and C were 10%, 30% and 60% respectively as shown in FIG. 6.

Let the weighted parameter for the attribute class a be 55% as shown in FIG. 7. In this case, the transmission priorities for the pieces of EPG information of the programs A, B and C for the attribute class a are 0.1*0.55, 0.3*0.55 and 0.6*0.55 respectively.

Next, the transmission priorities for the pieces of EPG information of the programs A, B and C for the attribute class b are found. On a certain day, in the period of time cited above, the sums of popularity rates pertaining to the attribute class b of the on-air programs A, B and C were 30%, 10% and 60% respectively as shown in FIG. 6.

Let the weighted parameter for the attribute class b be 35% as shown in FIG. 7. In this case, the transmission priorities for the pieces of EPG information of the programs A, B and C for the attribute class b are 0.3*0.35, 0.1*0.35 and 0.6*0.35 respectively.

Finally, the transmission priorities for the pieces of EPG information of the programs A, B and C for the attribute class c are found. Values for the attribute class c which are appropriately determined by the data distributor are 10%, 30% and 60% respectively as shown in FIG. 6.

Let the weighted parameter for the attribute class c be 10% as shown in FIG. 7. In this case, the transmission priorities for the pieces of EPG information of the programs A, B and C for the attribute class c are 0.1*0.1, 0.3*0.1 and 0.6*0.1 respectively.

Accordingly, the frequencies for the pieces of EPG information of the programs A, B and C are the sums of the priorities of transmission for the attribute classes a, b and c which are:

0.1*0.55+0.3*0.35+0.1*0.1=0.17, 0.3*0.55+0.1*0.35+0.3*0.1=0.23, and 0.6*0.55+0.6*0.35+0.6*0.1=0.6. That is to say, the pieces of EPG information of the programs A, B and C are transmitted at a ratio of 17:23:60.

The processing flow then goes on to a step STP10 at which the program/EPG-information multiplexing unit 212 multiplexes a program PR received from the program organizing/accumulating unit 211 with the EPG information IE received from the EPG-information outputting unit 343. The program PR multiplexed with the EPG information IE is then transmitted to the communication control unit 221 by way of the communication control unit 215 and the transmission medium 230.

The processing flow then proceeds to a step STP11 at which the communication control unit 221 separates the program PR and the EPG information IE transmitted by the program/EPG-information multiplexing unit 212 from each other and supplies the EPG information to the data display control unit 222. The processing flow then goes on to a step STP12 at which the EPG information IE from the communication control unit 221 is displayed by the data display control unit 222 on an information output apparatus, for example, a display unit, to the data receiver. The processing flow then proceeds to a step STP13 at which the data receiver determines whether or not the EPG information IE is to be selected.

If the data receiver selects the EPG information IE, the processing flow goes on to a step STP14 at which the select operation is detected and a desired program PR is displayed on the information output apparatus, typically, a display unit, to the data receiver. The processing flow then returns to the step STP4 to repeat the operations described above.

As such, one day is divided into several time units or segments. The frequency of transmission of a program s EPG information is controlled according to dynamic scheduling with a bandwidth varying dependently upon the popularity record of the program in each segment. As a result, the response to an access made by the data receiver can be improved.

What is claimed is:

1. A program-related-information transmission control apparatus employed on a data distributing side for transmitting program related information for programs to be broadcasted to a data receiving side by way of a data-transmission means, said apparatus comprising:

- a television-watching-record information collecting means for gathering information on television-watching records obtained in accordance with relevant television-watching operations from said data receiving side; and
- a transmission-condition controlling means for controlling conditions for transmitting said program related information of programs on the basis of said information on television-watching records made from viewer television-watching statistics so that said program related information most-likely desired is transmitted more frequently than said program related information which is less desired wherein said transmission-condition controlling means generates information on television-watching statistics for all attributes of each program from television-watching records, and determines transmission conditions for all said attributes of each program on the basis of said information on television-watching statistics and weighted parameters for all said attributes of each program.

2. A program-related-information transmission control apparatus according to claim 1 wherein said program related information includes either contents of programs, channels or schedules.

3. A program-related-information transmission control apparatus according to claim 1 wherein said data-transmission means is a transmission system for transmitting information by way of a satellite or a cable television network.

4. A program-related-information transmission control apparatus according to claim 1 wherein said television-watching-record-information collecting means gathers information on television-watching records obtained in accordance with relevant television-watching operations from said data receiving side by way of a public telephone line.

5. A program-related-information transmission control apparatus according to claim 1 wherein said television-watching-record-information collecting means gathers records of operations carried out by the television watcher to select channels at said data receiving side as information on television-watching records.

6. A program-related-information transmission control apparatus employed on a data distributing side for transmitting program related information for programs to be broadcasted to a data receiving side by way of a data-transmission means, said apparatus comprising:

- a television-watching-record information collecting means for gathering information on television-watching records obtained in accordance with relevant television-watching operations from said data receiving side; and
- a transmission-condition controlling means for controlling conditions for transmitting said program related information of programs on the basis of said information on television-watching records made from viewer television-watching statistics so that said program related information most-likely desired is transmitted more frequently than said program related information which is less desired;

wherein said transmission conditions are transmission intervals at which information on television-watching records is transmitted; and wherein said transmission intervals are each the reciprocal of the number of transmissions of information on television-watching records per unit time.

* * * * *